Figure 1:
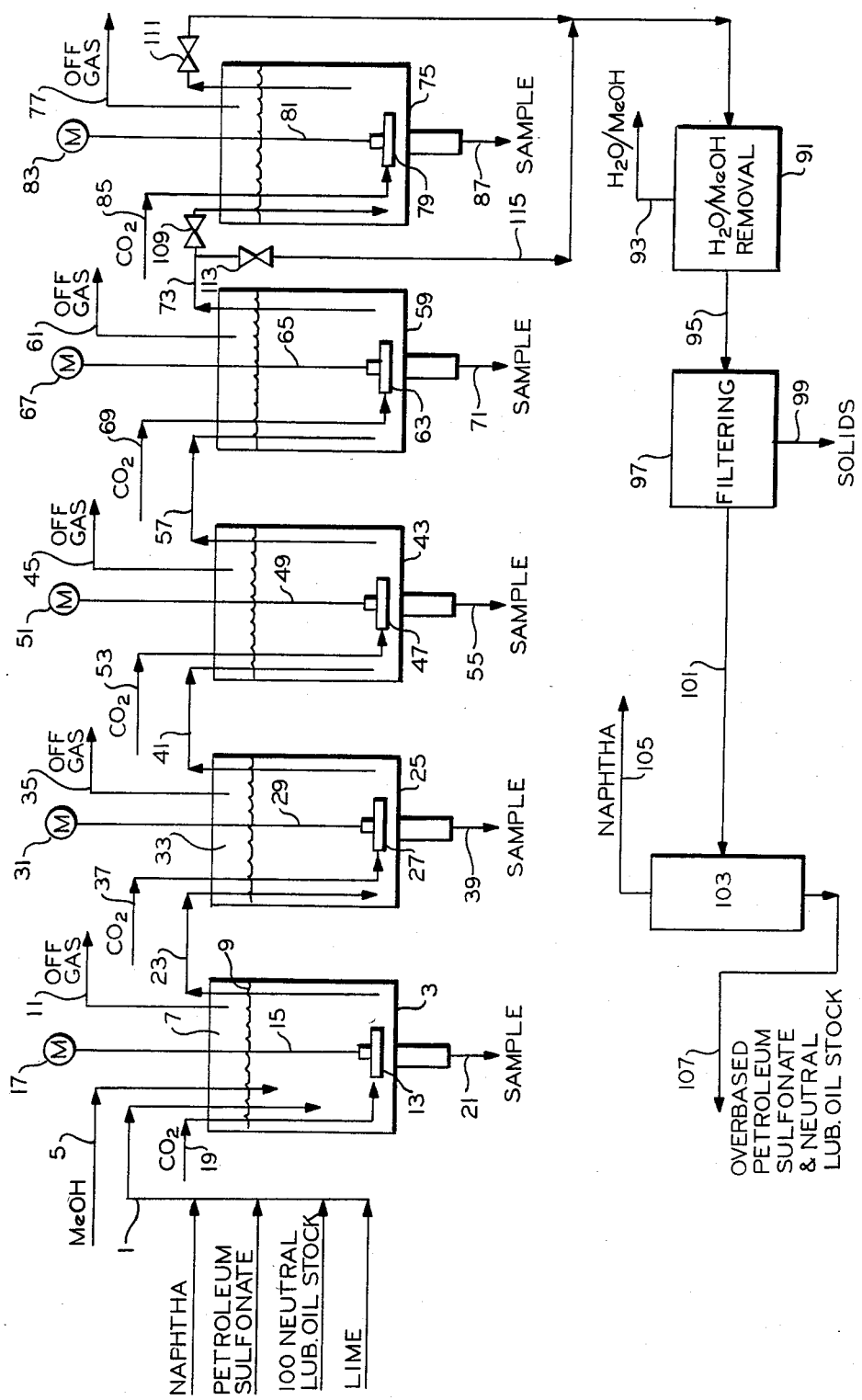

United States Patent [19]

Jack

[11] Patent Number: 4,541,939
[45] Date of Patent: Sep. 17, 1985

[54] CONTINUOUS PROCESS FOR HIGHLY OVERBASED PETROLEUM SULFONATES USING A SERIES OF STIRRED TANK REACTORS

[75] Inventor: Douglas S. Jack, Bartlesville, Okla.

[73] Assignee: Phillips Petroleum Company, Bartlesville, Okla.

[21] Appl. No.: 594,642

[22] Filed: Mar. 28, 1984

[51] Int. Cl.$^4$ .............................................. C10M 1/40
[52] U.S. Cl. .......................................... 252/33; 252/18
[58] Field of Search ...................................... 252/33, 18

[56] References Cited

U.S. PATENT DOCUMENTS

| | | | |
|---|---|---|---|
| 3,105,049 | 9/1963 | Voorhees | 252/33 |
| 3,318,809 | 5/1967 | Bray | 252/33 |
| 3,523,898 | 8/1970 | De Vault | 252/33 |
| 3,658,703 | 4/1972 | Gragson et al. | 252/33 |
| 4,086,170 | 4/1978 | De Clippelier et al. | 252/33 |
| 4,165,291 | 8/1979 | Gragson | 252/33 |

Primary Examiner—Jacqueline V. Howard
Attorney, Agent, or Firm—A. W. Umphlett

[57] ABSTRACT

A method and apparatus for the continuous overbasing of petroleum sulfonate in which there is a seriatim contacting at reaction conditions in a series of at least four stirred reaction zones of $CO_2$ with a feedstock mixture in the first reaction zone containing (1) petroleum sulfonate, (2) 100 neutral lube oil, (3) $Ca(OH)_2$, (4) methanol, and (5) naphtha and a feedstock mixture in each successive reaction zone that is the effluent from the last previous reaction zone. Method and apparatus for the recovery of a dispersion of $CaCO_3$ in a mixture of calcium petroleum sulfonate and 100 neutral lube oil stock as product from the last reaction zone effluent.

16 Claims, 1 Drawing Figure

CONTINUOUS PROCESS FOR HIGHLY OVERBASED PETROLEUM SULFONATES USING A SERIES OF STIRRED TANK REACTORS

BACKGROUND OF THE INVENTION

This invention relates to overbasing a calcium petroleum sulfonate. In another of its aspects this invention relates to the preparation of a lubricating oil additive. In still another of its aspects this invention relates to the production of calcium petroleum sulfonate having a high total base number (TBN) for use as an additive in lubricating oils, particularly crankcase oils for internal combustion engines to impart detergency and reduce sludge formation.

In one of its concepts this invention provides a process for overbasing a calcium petroleum sulfonate by manipulation of process steps, particularly the addition of carbon dioxide, to provide a product having a TBN in desirable range.

Among the materials that impart detergency to lubricating oils thereby being of assistance in keeping internal engine parts clean and reducing sludge formation in the oil are overbased calcium petroleum sulfonates. These sulfonates are known to be useful as additives for lubricating oils, particularly crankcase oils for internal combustion engines.

It is known that equivalent detergency characteristics can be obtained with a lower concentration of additive in a lubricating oil —the higher the alkaline reserve of an additive: the larger the quantity of acidic combustion products accumulated in the oil to which the additive is added that can be neutralized by the additive. The measurement of alkaline reserve is reported as total base number (TBN) which is the number of milligrams of potassium hydroxide equivalent to the amount of acid required to neutralize the alkaline constituents present in one gram of sample. An additive having a total base number higher than can be obtained from calcium petroleum sulfonate alone is commonly said to be "overbased" or, alternatively, is said to be "superbasic".

Petroleum sulfonic acid which is neutralized to form petroleum sulfonates normally includes appreciable amounts of various hydrocarbons not having the acid group capable of forming the sulfonate so that the resulting product is a mixture of hydrocarbons and petroleum sulfonates. When the sulfonic acid is neutralized with an excess of CaO or $Ca(OH)_2$ to form the sulfonate, the resulting product has a relatively small alkaline reserve. The addition of a large excess of neutralizing material normally does not materially increase the alkaline reserve since the excess material is removed, usually by filtration, prior to the use of the sulfonate in a lubricant. The previously known processes for overbasing calcium petroleum sulfonates have experienced difficulty in obtaining sufficiently high alkaline reserves, e.g., TBN of 300 mg KOH/gm or higher, to enable the formulator to use lower amounts of additive while maintaining equivalent detergency or to protect the engine adequately under conditions of high acid formation in the combustion process.

It has now been found that overbased calcium petroleum sulfonates can be produced by a continuous process using a series of at least four, preferably five, stirred reactors to provide product having an alkaline reserve measured as a TBN of 300 mg KOH/gm or higher. The process has been found to be most flexible in that, since 300 TBN can be continuously achieved in four reactors, one reactor of the optimum five-reactor system can be taken off stream for maintenance without shutting down the entire unit.

It is therefore an object of this invention to provide an overbased calcium petroleum sulfonate having high alkaline reserve. It is another object of this invention to provide lubricating additive containing overbased calcium petroleum sulfonate having high alkaline reserve. It is another object of the invention to provide a process for preparing an overbased calcium petroleum sulfonate having high alkaline reserve. It is still another object of this invention to provide a process for preparing a lubricating additive containing overbased calcium petroleum sulfonate having a high alkaline reserve.

Other aspects, concepts, and objects of this invention along with its several advantages will be apparent from a study of this disclosure and the appended claims.

STATEMENT OF THE INVENTION

According to this invention there is a provided a continuous process for preparing highly overbased petroleum sulfonates in which there is a seriatim contacting at reactor conditions of carbon dioxide with a feedstock mixture in each of a series of at least four stirred reaction zones with the feedstock mixture in the first reaction zone comprising (1) petroleum sulfonate, (2) 100 neutral lube oil (100 SUS at 100° F.), (3) $Ca(OH)_2$, (4) methanol (MeOH), and (5) naphtha and the feedstock mixture in each stirred reaction zone subsequent to the first zone being the effluent from the previous zone.

In a preferred embodiment of the invention there are four stirred reaction zones. In the most preferred embodiment of the invention there are five stirred reaction zones.

In the embodiments of the invention the apparatus comprises a series of at least four stirred reaction zones in which each zone comprises (a) a closed reactor; (b) a driven agitation means; (c) inlet means for feedstock comprising lime, 100 neutral lubricating stock, petroleum sulfonate, naphtha, and methanol; (d) separate inlet means for controlled inlet flow of $CO_2$; (e) means for eliminating off gas from the reactor; and (f) means for passing reaction product from the reactor.

This invention provides a continuous process for producing a detergent-dispersive additive for motor oils by reacting carbon dioxide ($CO_2$) with lime $Ca(OH)_2$ in the presence of methanol and simultaneously dispersing the resultant calcium carbonate ($CaCO_3$) in a 50/50 mixture of calcium petroleum sulfonate and 100 neutral lubricating oil, i.e., a finished 100 neutral lube stock. The reaction is carried out in naphtha solvent.

In general, each of the reactors is run at conditions in which sufficient agitation is provided to cause upflow of the lime particles within the reactor but low enough to avoid severe breakup and consequent dispersion of the incoming bubbles so that reaction rate may be properly controlled.

In the most preferred embodiment of the invention in which there are five stirred reaction zones, the maximum reaction temperature is controlled so that it does not exceed 117° F. and this reaction temperature occurs in the second reaction zone. The $CO_2$ is continuously distributed to the reaction zone so that the first zone receives no more than 10 volume percent of the total $CO_2$ fed to the process; the second zone receives the greatest portion of the $CO_2$ feed, but this portion does not exceed 45 volume percent of the total $CO_2$ fed to the process; and zones 4 and 5, taken together, receive no more than 20 volume percent of the total $CO_2$ fed to the process.

When four stirred reaction zones are used in the preferred embodiment of the invention the following reaction parameters are observed: The maximum reaction temperature is controlled so that it does not exceed 117° F. and this reaction temperature occurs in the second reaction zone. The $CO_2$ is continuously distributed to the reaction zone so that the first zone receives no more than 10 volume percent of the total $CO_2$ fed to the process; the second zone receives the greatest portion of the $CO_2$ fed to the process; and zone 4 receives no more than 20 volume percent of the total $CO_2$ fed to the process.

The product is then stripped of water and methanol, filtered to remove the solids and stripped of naphtha. The finished product is a colloidal dispersion of $CaCO_3$ in a range of about 20 to about 40 weight percent usually about 27 weight percent in 50/50 calcium petroleum sulfonate/100 neutral oil mixture.

In general, the stripping of water and methanol is a well known fractionation in which the following operating conditions are met: At least one or more stages of stripping with steam, nitrogen or other inert gas except $CO_2$ at a maximum of about 250° F. at preferably atmospheric pressure. The methanol/$H_2O$ content of the bottoms product from this stripping step should be at least less than 0.3 weight percent for best filterability.

The filtering of the product from which water and methanol has been removed is carried out by a filtering procedure, such as, preferably a vacuum filtration using a rotary precoated filter, the precoat consisting of diatomaceous earth or the like. This filtration is most effectively carried out between 180°–220° F. and about 12–15 inches Hg up to 26–28 inches Hg vacuum.

The removal of naphtha from the filtered product is accomplished by well known fractionation processes under operating conditions that include: An atmospheric packed or trayed tower which removes 80% of the naphtha followed by a vacuum fractionation to distill overhead the remaining naphtha while preventing the loss of the light ends of the 100 neutral lube oil stock.

Although overbased petroleum sulfonates can be produced in a series of three continuous stirred tank reactors such a system is found to be insufficiently tolerant of feedstock variations to be commercially feasible.

The petroleum sulfonates useful in the present invention can be described as neutral petroleum sulfonate prepared by sulfonating KC-250 brightstock (200 SUS at 210° F.). See U.S. Pat. No. 3,135,693, incorporated here by reference.

The neutral lube oil useful in this invention can be described as solvent refined 100 neutral lube oil stock having a viscosity of 100 SUS at 100° F.

The lime, calcium hydroxide, useful in the present invention can have a surface area of about 5 to 50 $M^2/g$. The lime is not soluble in the reaction mixture and is of sufficient density to tend to settle rapidly. A preferred hydrated lime or slaked lime $Ca(OH)_2$, is Kemilime manufactured by Ash Grove Cement Co., Kansas City, Mo.

The MeOH useful in this invention as promoter/solvent is described as methanol having 0 to 10 weight percent $H_2O$.

The naphtha used as diluent in this invention is described as petroleum naphtha with boiling point range 80° C.–300° C.

The $CO_2$ useful in this invention is described as technical grade or more chemically pure $CO_2$.

General reaction conditions to make overbased product having 300 total base number (defined as Mg.KOH equivalent/gram product) are as follows: The temperature for the carbonation reaction can range from 25° C. (77° F.) to 80° C. (176° F.), preferably 35° C. (95° F.) to 65° C. (149° F.). Pressure of the carbonation reaction can range from 1 psia to 30 psia, preferably 10 to 20 psia. The overbasing (carbonation) residence or reaction time can vary from 20 minutes to 120 minutes, preferably 50 to 70 minutes overall.

Feed component concentrations for the carbonation reaction are as follows:

| Component | Weight % of Total Feed | |
|---|---|---|
| | In General | Preferred |
| Carbon Dioxide ($CO_2$) | 2.0 to 10 | 4 to 7 |
| Hydrated Lime ($Ca(OH)_2$) | 5.0 to 20 | 10 to 15 |
| Neutral Oil (Calcium (Petroleum Sulfonate) | 5.0 to 15 | 7 to 12 |
| No. 10 Lubricating Oil Stock | 5.0 to 15 | 7 to 12 |
| Naphtha | 30.0 to 80.0 | 50 to 70 |
| Methanol | 2.0 to 10.0 | 3 to 7 |

The $CO_2$ is added as a vapor, lime as a solid and the rest of the components as liquids. In addition up to 1.0 weight percent water can be added in the feed and still achieve 300 total base number. Initial water concentrations greater than 1.0 weight percent, however, can be detrimental by reducing the base number of the product.

The invention is best described in conjunction with the drawing which is a schematic representation of a five reactor system followed by a purification system.

Referring now to the drawing, the reactants—lime in an amount of about 10 to about 12 weight percent of the total reaction mixture, 100 neutral lube stock in a concentration of about 6.7 to about 7.1 weight percent of the total reaction mixture, petroleum sulfonate in a concentration of about 6.7 to about 7.1 weight percent of the total reaction mixture, and naphtha in a concentration of about 69 to about 73 weight percent of the total reaction mixture are fed from individual supply sources through line (1) into the first reactor (3). Methanol in a concentration of about 3.8 to about 4.6 weight percent of the total reaction mixture is fed through line (5) into the first reactor (3). In the reactor, and each subsequent reactor, the liquid level is maintained to provide a vapor phase (7) over the liquid level (9), preferably with a vapor space and liquid in the reactor being about equal volume so that foaming which can occur during the process will not cause a problem by being carried out the offgas line (11).

The reactor (3) itself is a closed vessel having an agitator (13) connected by a shaft (15) to a motor (17) which runs continuously during the process and which is of sufficient size to provide upflow of the particulate lime within the liquid carrier. $CO_2$ is introduced into the first reactor through line (19) with discharge at a point near the blade (13) of the agitator to achieve sufficient dissemination of the $CO_2$ through the liquid. $CO_2$ is introduced into the system at an overall rate to provide a molar ratio of $CO_2$/lime in a range of about 0.66 to about 0.72 but the CO₂ is divided between the five reactors.

The first reactor (3) is maintained at a temperature in a range of about 95° to about 105° F. by means of jacketing, cooled baffles, or other means. The amount of $CO_2$ entering the first reactor through line (19) is about 3 to about 7 percent of the total $CO_2$ feed to the five reactors. Methanol is introduced through line (5) in an amount to provide about 3.8 to about 4.6 weight percent of the total reaction mixture. Under these reaction conditions a sample can be removed through line (21) showing that the weight percent water in the first reactor (3) is in the range of about 0.3 to about 0.6 weight percent of the total reaction mixture and that a TBN of about 35 to about 40 has been obtained in this reactor.

The reactor effluent passes through line (23) into the second reactor (25) which has agitator blades (27) attached by shaft (29) to a motor (31) rotated at sufficient speed to maintain an upflow of the particulate lime. Off gas is removed from the vapor space (33) through off-gas line (35). Carbon dioxide enters through line (37) in an amount that is about 35 to about 45 percent of the total carbon dioxide flow to the system and is discharged near the blade of the agitator. A sample taken from line (39) shows that the water content of this reactor is in a range of about 1.1 to about 1.4 weight percent of the total reaction mixture and that a TBN in the range of about 180 to about 200 has been obtained in this reactor.

Effluent from the second reactor (25) is passed through line (41) into the third reactor (43). This reactor, like its predecessors, contains an off gas line (45) and agitator blades (47) attached by shaft (49) to a motor (51) driven in the same manner as its predecessors. Carbon dioxide is passed through line (53) into the third reactor (43) in an amount that is about 30 to about 37 percent of the total carbon dioxide passed into the system. A sample taken from line (55) shows that the amount of water in this reactor is about 1.4 to about 1.8 weight percent of the total reaction mixture and that a TBN in the range of about 260 to about 280 had been obtained.

The effluent from the third reactor (43) is passed through line (57) into the fourth reactor (59). This reactor is also equipped with off gas line (61), agitator blades (63), agitator shaft (65), and motor drive (67) which maintains an agitator speed as in the previous reactors. $CO_2$ enters through line (69) to be discharged near the agitator blades. A sample taken through line (71) shows that the water content of this reactor is in a range of about 1.7 to about 2.0 weight percent of the total reaction mixture and that a TBN in the range of about 295 to about 310 had been obtained.

Effluent from the fourth reactor (59) passes through line (73) into the fifth reactor (75). This reactor is also equipped with an offgas line (77), agitator blades (79), agitator shaft (81), and a motor (83) driven to provide continuous agitation as in the previous reactors. Carbon dioxide is passed through line (85) to discharge at a point near the agitator blades at a rate that is up to about 10 percent of the total $CO_2$ fed into the system. A sample taken through line (87) shows that the amount of water in this reactor is in a range of about 1.8 to about 2.2 weight percent of the total reaction mixture and that a TBN in the range of about 310 to about 330 had been obtained.

Effluent from the fifth reactor is passed through line (89) into a dryer system (91) maintained at a temperature in a range of about 220° to about 250° F. in which water and methanol are removed through line (93). The dried liquid is then passed through line (95) to a filtering means, preferably a commercial rotary filter (97) from which solids are removed through line (99). The filtered liquid is passed through line (101) to a two step fractionator (103) maintained at atmospheric conditions for step one and vacuum conditions in step two in which the naphtha is removed as overhead through line (105) and the overbased petroleum sulfonate/100 neutral lube stock mixture is removed as product through line (107).

It can be seen that with the conditions set out above, the fifth reactor (75) can, if necessary, be removed from service by closing valves (109) and (111) and opening valve (113) to pass the effluent from the fourth reactor (59) directly through line (73) and (115) into the drying unit (91) and still have a product having a TBN in the range of 295 to about 310.

The following table illustrates runs made using five reactors each of which had a volume of 9.4 gallons, a diameter of 1.17 feet at a height of 1.75 feet. Liquid depth was maintained at about 1.17 feet in the reactor. Each agitator had an impeller diameter of 0.54 feet, blade length of 0.18 feet, blade height of 0.14 feet, and the height of the impeller above the bottom of the tank was 0.10 feet. There were six impeller blades and the impeller speed was 400 rpm.

For the series of runs the results are shown in Table I below.

TABLE I

| | LARGE CONTINUOUS STIRRED TANK REACTOR RUNS | | | | | | | | | |
|---|---|---|---|---|---|---|---|---|---|---|
| | Reactor 1 | | Reactor 2 | | Reactor 3 | | Reactor 4 | | Reactor 5 | | Filtration |
| Run No. | $CO_2$, % | TBN | $CO_2$, % | TBN | $CO_2$, % | TBN | $CO_2$, % | TBN | $CO_2$, % | TBN | Quality |
| 1 | 5 | 35 | 40 | 189 | 35 | 293 | 15[(1)] | 279 | 5 | 301 | good |
| 2[(2)] | 5 | 56 | 40 | 201 | 35 | 291 | 15 | 334 | 5 | 340 | good |
| 3 | 5 | 40 | 40 | 185 | 35 | 293 | 15 | 313 | 5 | 326 | good |
| 4 | 5 | 39 | 40 | 201 | 35 | 284 | 15 | 320 | 5 | 328 | good |
| 5[(3)] | 5 | 34 | 40 | 158 | 35 | 230 | 15 | 249 | 5 | 262 | good |

[(1)]Leak in $CO_2$ line to this reactor
[(2)]Low 100 neutral stock concentration
[(3)]Lowered total $CO_2$ rates 10% from previous runs In the first run shown in Table I, 300 TBN was achieved even though no $CO_2$ was going into the fourth reactor due to a leak in the line. This further demonstrates the flexibility of the system as well as emphasizing the importance of getting the right amount of $CO_2$ into the front part of the system. In the next run shown in the table, the 100 neutral oil stock concentration was inadvertently 5–10 percent too low. High TBN's were easily achieved but the viscosity of the finished product was very high. The next two runs made in the series of ten-gallon CSTR's were made under identical conditions. Total base numbers greater than 325 were obtained, with 300 TBN easily exceeded in the fourth reactor.

In the last run, the total $CO_2$ rate was lowered by 10 percent; a TBN of only about 260 was obtained. This again emphasizes the importance of getting sufficient reaction taking place in the front part of the system. Although more $CO_2$ was actually fed to the system in this run than in the first run due to the $CO_2$ leak shown in Table I, the TBN in this run was about 40 base numbers lower. The reason for this is that more reaction took place in the front part of the system in the earlier run. Results in a series of five one-gallon CSTR's (data not shown) also demonstrated the bad effects of injecting too much $CO_2$ into the front part of the system, e.g., greater than 10 volume percent of the $CO_2$ into the first reactor.

We claim:

1. A continuous process for preparing highly overbased petroleum sulfonate comprising seriatim contacting $CO_2$ at reaction conditions of temperature of carbonation in a range from about 25° C. to about 80° C., pressure of carbonation reaction from about 1 psia to about 30 psia, and in a reaction time that can vary from about 20 minutes to about 120 minutes overall with a feedstock mixture in each of a series of at least four stirred reaction zones, said feedstock mixture in the first reaction zone comprising (1) petroleum sulfonate, (2) solvent refined 100 neutral lube oil stock, (3) $CA(OH)_2$, (4) methanol, and (5) naphtha and said feedstock mixture in each subsequent stirred reaction zone comprising effluent from the previous zone.

2. A process of claim 1 wherein the effluent from the last stirred reaction zone in said series is treated for removal of water and methanol, filtered, and treated for removal of naphtha to provide a colloidal dispersion of $CaCO_3$ in a mixture of calcium petroleum sulfonate and solvent refined 100 neutral lube oil stock.

3. A continuous process of claim 1 wherein there are four stirred reaction zones.

4. A continuous process of claim 1 wherein there are five stirred reaction zones in which the maximum reaction temperature, which does not exceed 117° F., occurs in the second reaction zone and the $CO_2$ is continuously distributed to the reaction zone so that the first zone receives no more than 10 volume percent of the total $CO_2$ fed to the process; the second zone receives the greatest portion of the $CO_2$ feed, but not exceeding 45 volume percent of the total $CO_2$ fed to the process; and zones 4 and 5 together receive no more than 20 volume percent of the total $CO_2$ fed to the process.

5. A continuous process of claim 1 wherein the components of the reaction mixture are present as weight percent of the total feed in amount carbon dioxide in a range of about 2.0 to about 10, of petroleum sulfonate in a range of about 5.0 to about 15, of solvent refined 100 neutral lube oil stock in a range of about 5.0 to about 15, of $CA(OH)_2$ in a range of about 5.0 to about 20, of methanol in a range of about 2.0 to about 10.0, and of naphtha in a range of about 30.0 to about 80.0.

6. A continuous process of claim 5 wherein the temperature of the carbonation reaction ranges from about 35° C. to about 65° C., the pressure of the carbonation reaction ranges from about 10 psia to about 20 psia, and the reaction time varies from about 50 to about 70 minutes overall.

7. A continuous process of claim 6 wherein the reactants are present as weight percent of the total feed in an amount of carbon dioxide in a range of about 4 to about 7, of petroleum sulfonate in a range of about 7 to about 12, of solvent refined 100 neutral lube oil stock in a range of about 7 to about 12, of $CA(OH)_2$ in a range of about 10 to about 15, of methanol in a range of about 3 to about 7, and of naphtha in a range of about 50 to about 70.

8. A continuous process of claim 5 wherein the effluent from the last stirred reaction zone in said series is treated for removal of water and methanol, filtered, and treated for removal of naphtha to provide a colloidal dispersion of $CaCO_3$ in a mixture of calcium petroleum sulfonate and solvent refined 100 neutral lube oil stock.

9. A continuous process of claim 6 wherein the effluent from the last stirred reaction zone in said series is treated for removal of water and methanol, filtered, and treated for removal of naphtha to provide a colloidal dispersion of $CaCO_3$ in a mixture of calcium petroleum sulfonate and solvent refined 100 neutral lube oil stock.

10. A continuous process of claim 7 wherein the effluent from the last stirred reaction zone in said series is treated for removal of water and methanol, filtered, and treated for removal of naphtha to provide a colloidal dispersion of $CaCO_3$ in a mixture of calcium petroleum sulfonate and solvent refined 100 neutral lube oil stock.

11. A continuous process of claim 5 wherein there are four stirred reaction zones.

12. A continuous process of claim 6 wherein there are four stirred reaction zones.

13. A continuous process of claim 7 wherein there are four stirred reaction zones.

14. A continuous process of claim 5 wherein there are five stirred reaction zones in which the maximum reaction temperature, which does not exceed 117° F., occurs in the second reaction zone and the $CO_2$ is continuously distributed to the reaction zones so that the first zone receives no more than 10 volume percent of the total $CO_2$ fed to the process; the second zone receives the greatest portion of the $CO_2$ feed, but not exceeding 45 volume percent of the total $CO_2$ fed to the process; and zones 4 and 5 together receive no more than 20 volume percent of the total $CO_2$ fed to the process.

15. A continuous process of claim 6 wherein there are five stirred reaction zones in which the maximum reaction temperature, which does not exceed 117° F., occurs in the second reaction zone and the $CO_2$ is continuously distributed to the reaction zones so that the first zone receives no more than 10 volume percent of the total $CO_2$ fed to the process; the second zone receives the greatest portion of the $CO_2$ feed, but not exceeding 45 volume percent of the total $CO_2$ fed to the process; and zones 4 and 5 together receive no more than 20 volume percent of the total $CO_2$ fed to the process.

16. A continuous process of claim 7 wherein there are five stirred reaction zones in which the maximum reaction temperature, which does not exceed 117° F., occurs in the second reaction zone and the $CO_2$ is continuously distributed to the reaction zones so that the first zone receives no more than 10 volume percent of the total $CO_2$ fed to the process; the second zone receives the greatest portion of the $CO_2$ feed, but not exceeding 45 volume percent of the total $CO_2$ fed to the process; and zones 4 and 5 together receive no more than 20 volume percent of the total $CO_2$ fed to the process.

* * * * *